United States Patent
Kasai

(10) Patent No.: US 10,546,336 B2
(45) Date of Patent: Jan. 28, 2020

(54) SEARCH DEVICE, SEARCH METHOD, PROGRAM, AND STORAGE MEDIUM

(71) Applicant: RAKUTEN, INC., Tokyo (JP)

(72) Inventor: Akira Kasai, Tokyo (JP)

(73) Assignee: Rakuten, Inc., Tokyo (JP)

(*) Notice: Subject to any disclaimer, the term of this patent is extended or adjusted under 35 U.S.C. 154(b) by 627 days.

(21) Appl. No.: 14/896,844

(22) PCT Filed: Mar. 7, 2014

(86) PCT No.: PCT/JP2014/056046
§ 371 (c)(1),
(2) Date: Dec. 8, 2015

(87) PCT Pub. No.: WO2015/132970
PCT Pub. Date: Sep. 11, 2015

(65) Prior Publication Data
US 2016/0140213 A1    May 19, 2016

(51) Int. Cl.
*G06Q 30/00* (2012.01)
*G06Q 30/06* (2012.01)
(Continued)

(52) U.S. Cl.
CPC ....... *G06Q 30/0625* (2013.01); *G06F 16/243* (2019.01); *G06F 16/3322* (2019.01);
(Continued)

(58) Field of Classification Search
CPC ............ G06Q 30/0623; G06Q 30/0625; G06F 16/3322; G06F 16/3323; G06F 16/3344;
(Continued)

(56) References Cited

U.S. PATENT DOCUMENTS 7,660,581 B2 * 2/2010 Ramer .................. G06Q 30/02
455/432.3
8,903,816 B2 * 12/2014 Dumon ................. G06Q 30/02
707/728
(Continued)

FOREIGN PATENT DOCUMENTS

JP              2012-3532 A       1/2012
WO     WO-2012160693 A1 * 11/2012     ....... G06F 17/30525

OTHER PUBLICATIONS

Machine Translation of WO 2012160693 A1, received Apr. 23, 2018 (Year: 2012).*

(Continued)

*Primary Examiner* — Anne M Georgalas
(74) *Attorney, Agent, or Firm* — Sughrue Mion, PLLC

(57) ABSTRACT

A search device includes a suggestion word presentation unit that presents a suggestion word based on the presentation priority by acquiring a suggestion word according to an input search string and a presentation priority from a suggestion word database, the suggestion word database storing the suggestion word and the presentation priority of the suggestion word associated to be searched by the input search string, a time information management unit that calculates time difference between a time when a search is performed and a time when a predetermined purchase operation or purchase preliminary operation is performed on a product which is related to the search and a priority management unit that updates the presentation priority stored in the suggestion word database to raise a presentation priority, which is associated with a suggestion word used for a search, higher as the time difference is smaller.

15 Claims, 8 Drawing Sheets

(51) Int. Cl.
*G06F 16/332* (2019.01)
*G06F 16/33* (2019.01)
*G06F 16/9032* (2019.01)
*G06F 16/951* (2019.01)
*G06F 16/242* (2019.01)

(52) U.S. Cl.
CPC ...... *G06F 16/3323* (2019.01); *G06F 16/3344* (2019.01); *G06F 16/90324* (2019.01); *G06F 16/951* (2019.01); *G06Q 30/0623* (2013.01)

(58) Field of Classification Search
CPC . G06F 16/243; G06F 16/90324; G06F 16/951
See application file for complete search history.

(56) References Cited

U.S. PATENT DOCUMENTS 9,286,391 B1\* 3/2016 Dykstra ................ G06F 16/285
2006/0253427 A1\* 11/2006 Wu ..................... G06F 17/3064
2014/0337308 A1\* 11/2014 De Francisci Morales ................
G06F 17/3089
707/708

OTHER PUBLICATIONS

"Using Site Semantics to Analyze, Visualize, and Support Navigation," Bettina Berendt, Data Mining and Knowledge Discovery, 6, 37-59, 2002. (Year: 2002).\*

"Query Recommendation for Optimizing the Search Engine Results," Nikita Taneja and Racha Chaudhury, International Journal of Computer Applications, vol. 50, No. 13, Jul. 2012, pp. 20-27. (Year: 2012).\*

"Using Site Semantics to Analyze, Visualize, and Support Navigation," Bettina Berendt, Data Mining and Knowledge Discovery, 6, 37-59, 2002. (previously provided) (Year: 2002).\*

"Query Recommendation for Optimizing the Search Engine Results," Nikita Taneja and Racha Chaudhury, International Journal of Computer Applications, vol. 50, No. 13, Jul. 2012, pp. 20-27. (previously provided) (Year: 2012).\*

\* cited by examiner

FIG. 5A

SUGGESTION WORD AND PRESENTATION PRIORITY INFORMATION
STORED IN SUGGESTION WORD DB5a

| RECORD ID | SEARCH WORD | | SEARCH WORD | | PRESENTATION PRIORITY |
|---|---|---|---|---|---|
| | MAIN INFORMATION | PHONETIC INFORMATION | MAIN INFORMATION | PHONETIC INFORMATION | |
| ID0001 | watch | tokei | | | Y0001 |
| ID0002 | watch | tokei | digital | dejitaru | Y0002 |
| ID0003 | watch | tokei | analog | anarogu | Y0003 |
| ID0004 | watch | tokei | men's | menzu | Y0004 |
| ⋮ | ⋮ | ⋮ | ⋮ | ⋮ | ⋮ |
| ID0012 | watch | tokei | degital | dejitaru | Y0012 |
| | men's | menzu | | | |
| ⋮ | ⋮ | ⋮ | ⋮ | ⋮ | ⋮ |
| ID00046 | watch | tokei | for digital | dejitaruyou | Y0046 |
| ⋮ | ⋮ | ⋮ | ⋮ | ⋮ | ⋮ |
| ID00071 | watch with | tokeitsuki | digital | dejitaru | Y0071 |
| ⋮ | ⋮ | ⋮ | ⋮ | ⋮ | ⋮ |

FIG. 5B

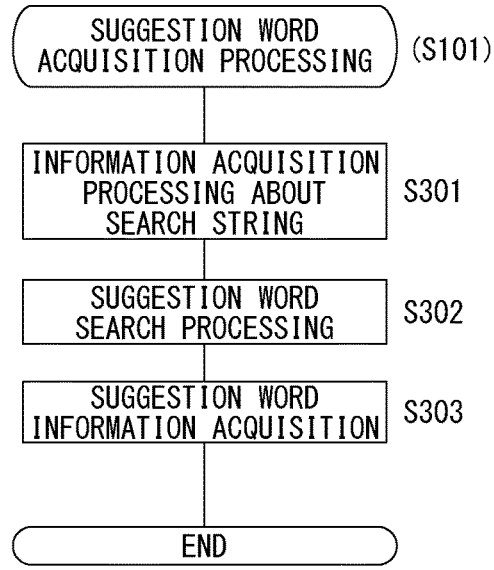

SUGGESTION WORD AND PRESENTATION PRIORITY INFORMATION
STORED IN SUGGESTION WORD DB5A

| RECORD ID | SEARCH WORD | | ... | PRESENTATION PRIORITY | TIME DIFFERENCE INFORMATION | |
| | MAIN INFORMATION | PHONETIC INFORMATION | ... | | TIME DIFFERENCE (MIN.) | DATE AND TIME |
|---|---|---|---|---|---|---|
| ID0001 | WATCH | tokei | ... | Y0001 | 35 | 01/06/2014 14:22 |
| | | | | | 91 | 01/07/2014 12:05 |
| | | | | | 26 | 01/07/2014 23:37 |
| | | | | | ⋮ | ⋮ |
| | | | | | 80 | 02/01/2014 07:11 |
| | | | | | 118 | 02/01/2014 08:56 |
| | | | | | 77 | 02/03/2014 22:08 |
| ⋮ | ⋮ | ⋮ | | ⋮ | ⋮ | |

SEARCH DEVICE, SEARCH METHOD, PROGRAM, AND STORAGE MEDIUM

CROSS REFERENCE TO RELATED APPLICATIONS

This application is a National Stage of International Application No. PCT/JP2014/056046 filed Mar. 7, 2014, the contents of which are incorporated herein by reference in their entirety.

TECHNICAL FIELD

The present invention relates to a technical field of a search device, a search method, a program, and a storage medium regarding an electronic commerce (e-commerce) by which a user purchases a product via a communications network. Specifically, the present invention relates to a presentation of a search string when searching the product.

CITATION LIST

Patent Literature

Patent Literature 1: Japanese Unexamined Patent Application Publication No. 2012-3532

BACKGROUND ART

A product search and a product purchase through a communications network, such as the Internet, have been popular. Under such circumstances, there has been proposed various search devices and product selling devices. Among the devices, there has been proposed a search device like, for example, Patent Literature 1. The search device presents highly-related phrases as suggestion words according to a search string input for product search. Here, for example, when a user inputs "TOKEI (Watch in Japanese)" as the search string for product search, the suggestion words mean candidates for the search including phrases highly related to the "TOKEI (Watch)". The search device presents the suggestion words. As one example, when the user inputs "TOKEI (Watch)" as the search string, the search device presents "TOKEI (Watch) digital", "TOKEI (Watch) men's", "TOKEI (Watch) digital men's", or a similar phase as the suggestion words. A space character between the "TOKEI (Watch)" and "digital" is used for performing an "AND search" of a plurality of phrases. In this example, the "AND search" is to acquire search results related to both the "TOKEI (Watch)" and "digital" phrases.

SUMMARY OF INVENTION

Technical Problem

When presenting the suggestion words during the product search, the order of the presented suggestion words influences whether the product will be purchased or not. Accordingly, the order of presenting the suggestion words is important. As the order of presenting the suggestion words, for example, the following is possible. The suggestion word employed for search many times by the user is preferentially displayed. Alternatively, the suggestion word with which many products are displayed as the search results is preferentially displayed.

However, the suggestion word used for the search does not always match the suggestion word that is likely to lead to the actual purchase.

Therefore, the object of the present invention is to present suggestion words appropriate for the search for product purchase.

Solution to Problem

First, a search device according to the present invention includes a suggestion word presentation unit, a time information management unit, and a priority management unit. The suggestion word presentation unit is configured to present a suggestion word based on the presentation priority by acquiring a suggestion word according to an input search string and a presentation priority from a suggestion word database. The suggestion word database stores the suggestion word and the presentation priority of the suggestion word associated to be searched by the input search string. The time information management unit is configured to calculate time difference between time when a search is performed and a time when a predetermined purchase operation or purchase preliminary operation is performed on a product which is related to the search. The priority management unit is configured to update the presentation priority stored in the suggestion word database to raise a presentation priority, which is associated with a suggestion word used for a search, higher as the time difference is smaller.

This presents the suggestion words based on the presentation priorities to which the time taken until the purchase has been reflected. This allows presenting the suggestion words appropriate for the search to purchase the product.

Second, with the above-described search device according to the present invention, the following is preferable. The priority management unit is configured to update the presentation priority using the time difference based on a user action performed in a predetermined period. The time difference is acquired by the time information management unit.

Presenting the suggestion words to which the user action performed in the predetermined period has been reflected allows presenting appropriate suggestion words to which a trend, which changes according to a fashion and a season, has been reflected.

Third, with the above-described search device according to the present invention, the following is preferable. The time information management unit is configured to calculate the time difference based on a log regarding a search and a log regarding a purchase operation or a purchase preliminary operation.

Calculating the time difference from the logs regarding the search and the logs regarding the purchase operation or a similar operation acquires the required information from formalized information. This allows easily performing the time difference computation processing.

Fourth, with the above-described search device according to the present invention, the following is preferable. When the log regarding the purchase operation or the purchase preliminary operation is detected, the time information management unit is configured to search a log regarding a search performed before the purchase operation or the purchase preliminary operation. The time information management unit is configured to calculate the time difference based on the log regarding the purchase operation or the purchase preliminary operation and the log regarding the search.

By calculating the time difference in the case where the logs regarding the purchase operation or the purchase preliminary operation, which is less than the logs regarding the search, are detected, the time difference computation processing can be effectively performed.

Fifth, with the above-described search device according to the present invention, the following is preferable. The time information management unit is configured to acquire user information and product information. The user information and the product information are included in the log regarding the purchase operation or the purchase preliminary operation. The time information management unit is configured to search a log regarding a search having identical user information and identical product information. The time information management unit is configured to calculate the time difference based on the log regarding the purchase operation or the purchase preliminary operation and the log regarding the search.

This allows linking the product information acquired by the search and the purchase operation performed based on the product information. This allows performing the time difference computation processing with more certainty.

Sixth, with the above-described search device according to the present invention, the following is preferable. In the suggestion word database, a plurality of presentation priorities are associated with each suggestion word. The suggestion word presentation unit is configured to acquire at least one presentation priority selected from a plurality of presentation priorities.

This presents the suggestion words based on the presentation priorities selected according to the situation. This allows providing an environment of ensuring presenting the suggestion words going with various situations.

Seventh, with the above-described search device according to the present invention, the following is preferable. The suggestion word database stores a presentation priority for each user attribute as a plurality of presentation priorities indicative of a user attribute of a user who performs a search. The suggestion word presentation unit is configured to select and acquire a presentation priority according to the user attribute of the user who performs the search.

The arrangement of the suggestion words is changed based on the presentation prioritizes different depending on the user, and the suggestion words are presented. This allows providing an environment of presenting the appropriate suggestion words along the user attribute.

Eighth, with the above-described search device according to the present invention, the following is preferable. The suggestion word database stores a presentation priority for each product category as a plurality of presentation priorities. The suggestion word presentation unit is configured to select and acquire a presentation priority according to a product category selected during a search.

The arrangement of the suggestion words is changed based on the presentation prioritizes different depending on the genre of the product, and the suggestion words are presented. This allows providing an environment of presenting the suggestion words appropriate for the product to be searched.

A search method according to the present invention includes presenting a suggestion word based on the presentation priority by acquiring a suggestion word according to an input search string and a presentation priority from a suggestion word database. The suggestion word database stores the suggestion word and the presentation priority of the suggestion word associated to be searched by the input search string. The search method includes calculating time difference between time when a search is performed and a time when a predetermined purchase operation or purchase preliminary operation is performed on a product which is related to the search. The search method includes updating the presentation priority stored in the suggestion word database to raise a presentation priority, which is associated with a suggestion word used for a search, higher as the time difference is smaller.

This search method establishes an environment of presenting the suggestion word appropriate for the search to purchase the product.

A program according to the present invention is a program configured to cause a processing unit to perform processing performed as the search method.

A storage medium according to the present invention is a storage medium storing the program. These programs and storage medium achieve the above-described search device.

Advantageous Effects of Invention

According to the present invention, the suggestion words presented during the search are sorted and presented based on a presentation priority calculated based on time difference after the search is performed until a purchase operation or a purchase preliminary operation is performed. This allows presenting the suggestion words appropriate for the searching to purchase a product.

BRIEF DESCRIPTION OF THE DRAWINGS

FIGS. 5A and 5B are a drawing for describing an exemplary search database and a flowchart for describing a flow of suggestion word acquisition processing;

DESCRIPTION OF EMBODIMENTS

The following describes embodiments in the order listed below.
1. Overall Configuration
2. Hardware Configuration
3. Flow of Processing
4. Other Embodiments
5. Exemplary Suggestion word Search Processing
5-1. First Exemplary Suggestion word Search Processing
5-2. Second Exemplary Suggestion word Search Processing
6. Modifications
7. Summary
8. Program and Storage Medium 1. Overall Configuration The following describes an overall configuration including a search device according to the embodiments with reference to FIG. 1 and FIG. 2.

Figure 1:
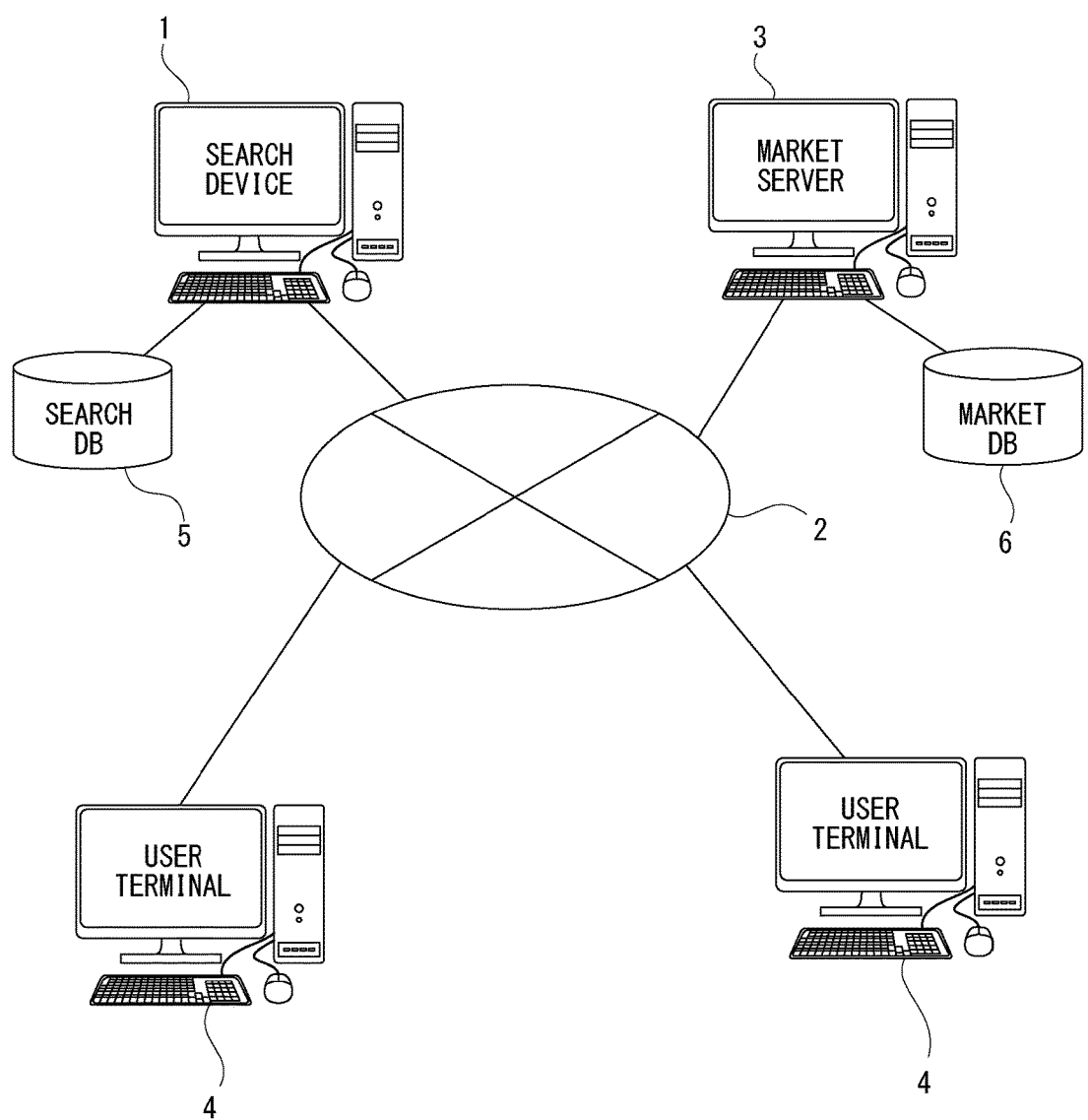
FIG. 1 is a drawing illustrating an overall configuration of an embodiment of the present invention.

As illustrated in FIG. 1, a search device 1 is mutually communicatively coupled to a market server 3, user terminals 4, 4, and so on via a communications network 2.

This embodiment describes an example where products are purchased and searched on a shopping mall virtually disposed on the communications network 2. Therefore, the following describes using the search device 1 as an exemplary device that performs search on at least a product from information managed by the market server 3.

The configuration of the communications network 2 is not especially limited. For example, the Internet, an intranet, an extranet, a Local Area Network (LAN), a Community Antenna TeleVision (CATV) communications network, a Virtual Private Network, a telephone network, a mobile telecommunications network, a satellite communications network, or a similar network is assumed.

Various examples of a transmission medium constituting the all or a part of the communications network 2 are also assumed. For example, a wire system, such as the Institute of Electrical and Electronics Engineers (IEEE) 1394, a Universal Serial Bus (USB), a power-line carrier, and a telephone line, an infrared radiation, such as an Infrared Data Association (IrDA), and also a wireless system, such as the Bluetooth (registered trademark), the 802.11 wireless, a mobile phone network, a satellite channel, and a digital terrestrial network are applicable.

The search device 1 is a system that performs search processing, presentation processing of search results, presentation processing of suggestion words, or similar processing during searching a product or a similar item by the user. The search device 1 is coupled to a search database (DB) 5. The search DB 5 stores information required for the processing. The search DB 5 includes a suggestion word DB 5a and a log DB 5b, which will be described later.

The market server 3 is a server that performs processing of exchanging information stored in a market DB 6 during the product search by the search device 1, various processing occurring during purchase when the user purchases the product (for example, processing regarding a delivery, notification processing to a shop who deals the product, and processing regarding a payment for a product price), or similar processing. The market server 3 is coupled to the market DB 6, which stores the information on a dealt product or similar information.

The user terminal 4 is a terminal used by the user who uses the search device 1 and the market server 3. The user terminals 4 are various terminals such as a Personal Computer (PC) that has a communication function, a mobile phone, and Personal Digital Assistants (PDA).

Figure 2:
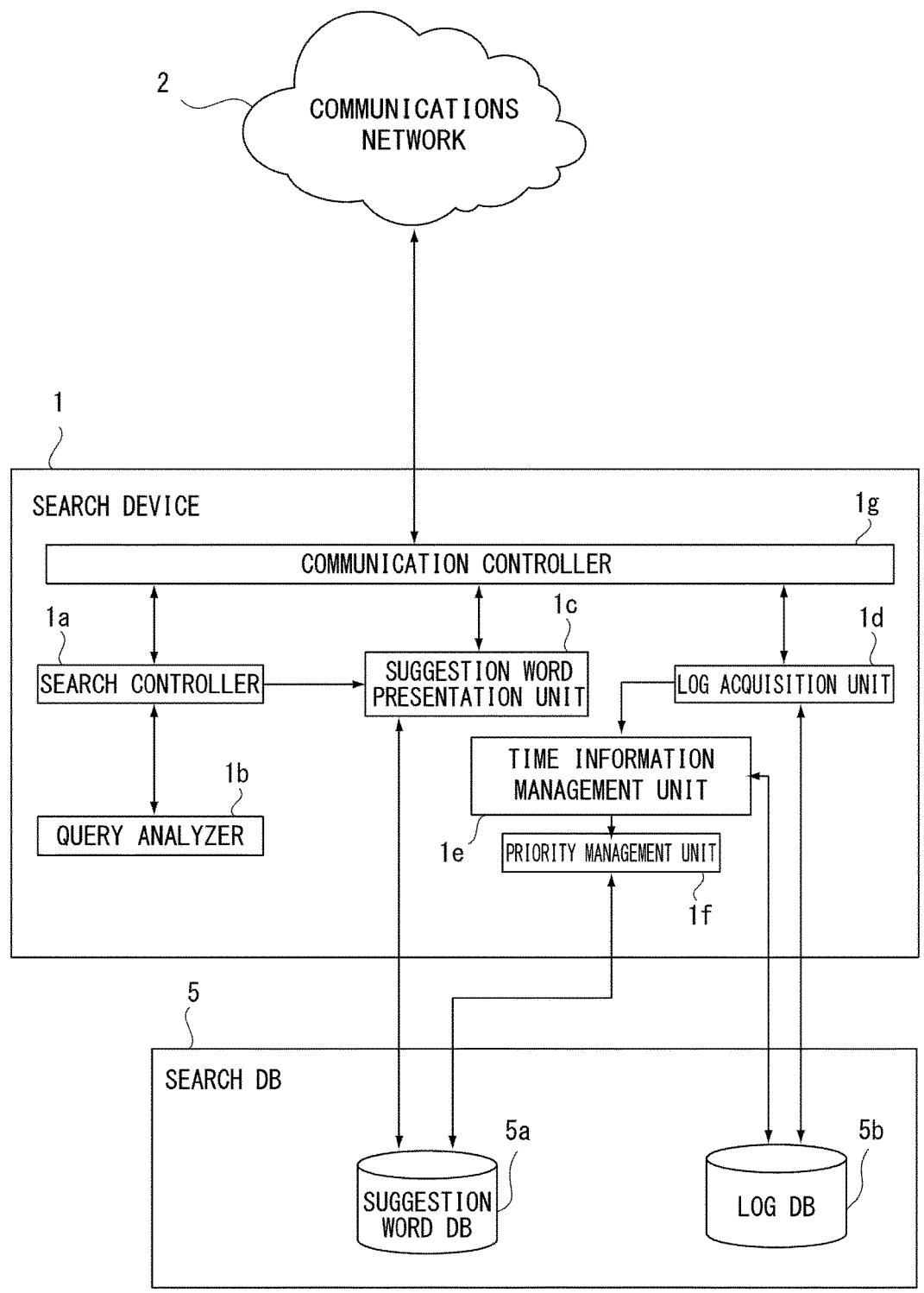
FIG. 2 is a drawing illustrating a block diagram of a search device of this embodiment.

The search device 1, as illustrated in FIG. 2, includes a search controller 1a, a query analyzer 1b, a suggestion word presentation unit 1c, a log acquisition unit 1d, a time information management unit 1e, a priority management unit 1f, and a communication controller 1g.

The search controller 1a performs the search processing, instructs presenting the suggestion words for search when the user searches the product, or performs similar processing. Specifically, the search controller 1a acquires information in the market DB 6 via the communications network 2, performs an instruction to perform analysis processing on a search string input by the user via the user terminal 4, or performs similar processing.

The query analyzer 1b analyzes the search string input by the user. Specifically, the query analyzer 1b performs processing to receive the search string from the search controller 1a and extract the search words from the character string. For example, when receiving "TOKEI (Watch) men's" as the search string, the query analyzer 1b performs the processing of extracting "TOKEI (Watch)" and "men's" as the search words. From the search string "TOKEI (Watch) for men", the query analyzer 1b extracts the search words, for example, "men's" and "TOKEI (Watch)."

The suggestion word presentation unit 1c receives the search string or a similar character input by the user. Then, the suggestion word presentation unit 1c presents the suggestion words added a highly-related search word. For example, the suggestion word presentation unit 1c receives the search string input by the user and the search words "men's" and "TOKEI (Watch)", which are extracted by the query analyzer 1b, from the search controller 1a. Then, the suggestion word presentation unit 1c adds related search words to the suggestion words and presents the search words as the suggestion words to the user. More specifically, the suggestion word presentation unit 1c receives the search string "men's TOKEI (Watch)" and the search words, such as "men's" and "TOKEI (Watch)", which are extracted from the search string, from the search controller 1a. The suggestion word presentation unit 1c adds the search words related to both the "men's" and "TOKEI (Watch)" search words, "digital" and "analog", to the search string "men's TOKEI (Watch)". The suggestion word presentation unit 1c transmits "men's TOKEI (Watch) digital" and "men's TOKEI (Watch) analog" as the suggestion words to the user terminal 4 via the communications network 2. Here, to the search string, suggestion words to which two or more search words have been added may be presented. For example, in the case of the search string being "men's TOKEI (Watch)", suggestion words to which two search words "digital" and "made in Japan" have been added, "men's TOKEI (Watch) digital Made in Japan", may be presented.

Whenever the user inputs one character as the search string and the search word, the suggestion word presentation unit 1c presents a new suggestion word. That is, when the user inputs "TOKEI (Watch)" in Roman alphabet, at a phase of inputting "t", which is the first character, "TOMATO (Tomato in Japanese)", "TOKEI (Watch)", "TABLE (Table in Japanese)", and a similar character are presented according to a presentation priority. Next, at the phase where the user inputs "to" (first Japanese character of "to") or (to), since the "TABLE (Table)" is removed from the candidates, "TOMATO (Tomato)", "TOKEI (Watch)", and a similar character are presented as the suggestion words.

To perform the processing, the suggestion word presentation unit 1c is coupled to the suggestion word DB 5a storing the suggestion words and the presentation priorities of the suggestion words to ensure transmission and reception of the information.

The log acquisition unit 1d performs processing of acquiring operation logs when the user performs the search and storing the operation logs in the log DB 5b. Specifically, for example, the log acquisition unit 1d acquires search operation logs and purchase operation logs from an entire log DB and performs processing of storing the search operation logs and the purchase operation logs in the log DB 5b. The entire log DB stores all logs related to user operations operated on the user terminal 4. The search operation log is generated when the search is performed. The purchase operation log is generated when the purchase operation and a preliminary operation are performed. Further, when the log DB 5b stores the purchase operation logs, the log acquisition unit 1d notifies the time information management unit 1e of the fact of the update of information stored in the log DB 5b.

Here, the search operation log is, for example, information associating a user ID as identification information of the user who has performed the search, the search string, time information when the search is performed, each product ID as identification information of a product presented to the user as the search result, or similar information.

The purchase operation log is a log generated when the user performs the purchase operation and the purchase preliminary operation. The purchase operation log is, for example, information associating a user ID of the user who has performed the purchase operation and the purchase preliminary operation, time information when the purchase operation and the purchase preliminary operation are performed, a product ID of an operation target product, or similar information.

Here, the purchase operation is an operation performed when the product is actually purchased. Some specific examples are described below. For example, to purchase a product, when inputting credit card information or similar information and then pressing a "Confirm Order" button, the operation of pressing the "Confirm Order" button corresponds to the purchase operation. Another example is an operation of pressing a "Place Order" button performed after terminating various inputs of a delivery condition or similar information required when purchasing a product. Further, another example is that after the user confirms the order and receives an e-mail for final confirmation on the order at an e-mail address that the user registers, the purchase operation is an operation to cause the user to finally confirm the order on a web page associated with a Uniform Resource Locator (URL) described in the e-mail.

The purchase preliminary operation is an operation considered to lead to the purchase of a product.

In the case of a product sales system where a product can be purchased on the shopping mall virtually disposed on the communications network 2, to allow a payment of a plurality of products at once, the product sales system may provide a function like a shopping cart that temporarily ensures the product under consideration of purchase. The purchase preliminary operation can be an operation that ensures the product in such virtual shopping cart. To eliminate a labor of searching a favorite product again, a function to flag a check flag (for example, a favorite list and a watchlist) on each product may be provided. The operation of flagging this check flag can be considered to be included in the purchase preliminary operation.

In the following description, unless otherwise designated, the purchase operation is described incorporating both the purchase operation and the purchase preliminary operation.

The time information management unit $1e$ performs processing of calculating time difference between time when the user performs the search and a time when the user performs the purchase operation or the purchase preliminary operation. Specifically, when the time information management unit $1e$ receives a notification of the fact of the update regarding the purchase operation log in the log DB $5b$ by the log acquisition unit $1d$, the time information management unit $1e$ extracts a time when the search operation and the purchase operation are performed by the identical user from the logs of the respective operations from the log DB $5b$. Next, the time information management unit $1e$ calculates the time difference from each extracted operation time. The time information management unit $1e$ performs processing of transferring this time difference or similar information to the priority management unit $1f$.

Details of processing when calculating the time difference will be described later.

To perform the above-described processing, the time information management unit $1e$ is coupled to the log acquisition unit $1d$ so as to receive an update notification regarding the purchase operation log. To ensure acquisition of the search operation logs and the purchase operation logs, the time information management unit $1e$ is also coupled to the log DB $5b$.

The priority management unit $1f$ receives the information on the time difference from the time information management unit $1e$ and performs processing of updating presentation priorities of the respective suggestion words stored in the suggestion word DB $5a$. Specifically, the priority management unit $1f$ receives the time difference from the time information management unit $1e$, the product ID of the product targeted for the purchase operation and the purchase preliminary operation, and the search string acquired from the search operation log. Next, the priority management unit $1f$ updates the presentation priorities which is associated with the search strings based on the information received from the time information management unit $1e$. The details of the update processing of the presentation priorities will be described later.

The communication controller $1g$ performs a control for the search device 1 to exchange information with an external terminal or a similar terminal. Specifically, the communication controller $1g$ receives the search string input by the user, transmits the suggestion words presented to the user, or performs a similar operation.

In this embodiment, the search string input by the user means a character string input to an input form for search by the user. The search string is an input character string, composition, or similar character, and in some cases, a plurality of words are separated by spaces. The search string is, for example, "TOKEI (Watch) men's digital" and "best-selling digital TOKEI (Watch) for men."

The search word is a phrase used for actual search by the search device 1. The search words are, for example, "best", "selling", "men", "digital", and "TOKEI (Watch)", which are extracted from a composition like "best-selling digital TOKEI (Watch) for men."

Further, the suggestion word means a character string for search presented to the user by the search device 1. For example, in the case where the search string input by the user is "TOKEI (Watch)", the suggestion words are a character string such as "TOKEI (Watch) men's", "TOKEI (Watch) digital", and "TOKEI (Watch) men's digital" presented by the search device 1.

2. Hardware Configuration

Figure 3:
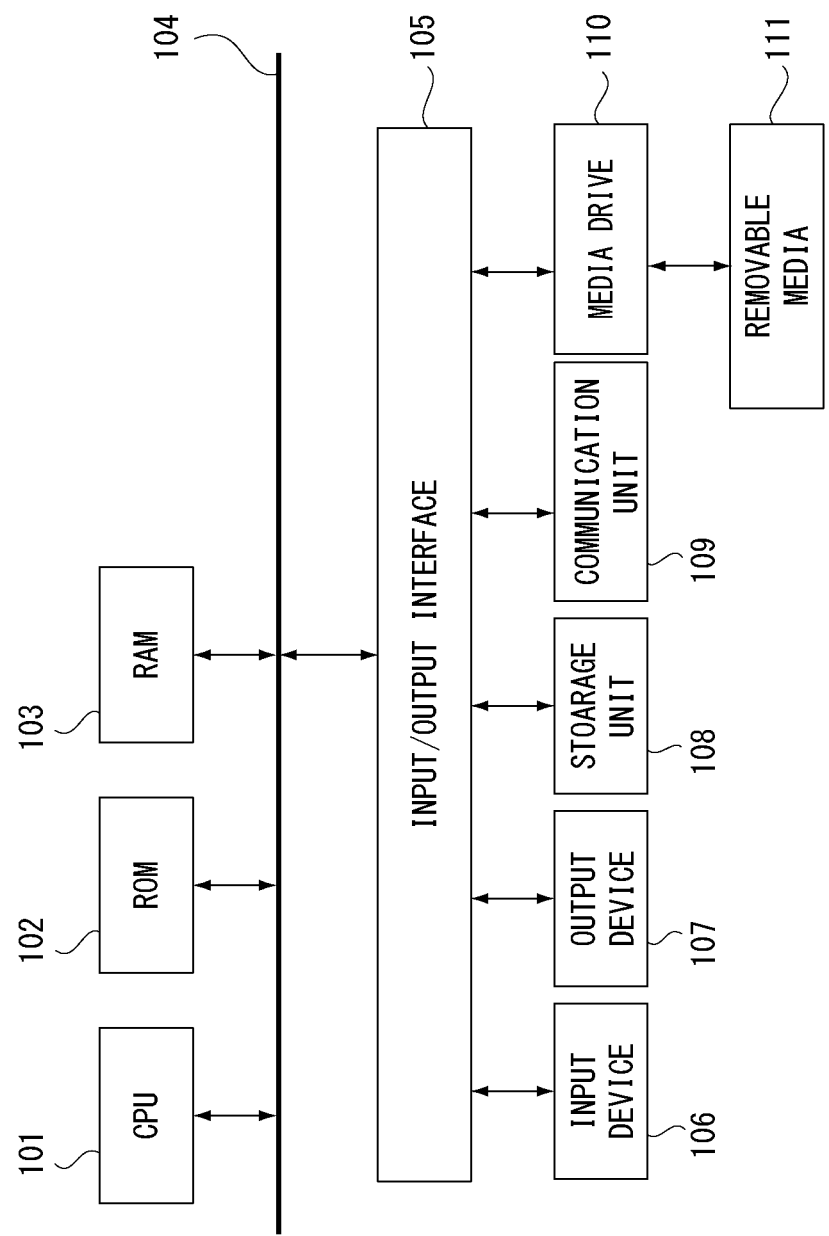
FIG. 3 is a block diagram of a computer of this embodiment.

FIG. 3 is a drawing illustrating exemplary hardware of the search device 1, the market server 3, and the user terminal 4 illustrated in FIG. 1. A central processing unit (CPU) 101 in a computer device in the respective servers and terminals performs various processing in association with a program stored in a Read Only Memory (ROM) 102 or a program loaded from a storage unit 108 to a Random Access Memory (RAM) 103. The RAM 103 also appropriately stores data required for the CPU 101 to perform the various processing or similar data.

The CPU 101, the ROM 102, and the RAM 103 are mutually coupled via a bus 104. An input/output interface 105 is also coupled to this bus 104.

To the input/output interface 105, an input unit 106, an output unit 107, the storage unit 108, and a communications unit 109 are coupled. The input unit 106 is formed of a keyboard, a computer mouse, a touchscreen, or a similar unit. The output unit 107 is formed of a display formed of a Liquid Crystal Display (LCD), a Cathode Ray Tube (CRT), an organic Electroluminescence (EL) panel, or a similar unit; and a speaker or a similar unit. The storage unit 108 is constituted of a Hard Disk Drive (HDD), a flash memory device, or a similar device. The communications unit 109 performs communications processing and communications between devices via the communications network 2.

Additionally, a media drive 110 is coupled to the input/output interfaces 105 as necessary. A removal medium 111, such as a magnetic disk, an optical disk, a magneto-optical disk, or a semiconductor memory, is appropriately mounted. Thus, information is written to and read from the removal medium 111.

Such computer device uploads and downloads data and a program through communications with the communications unit 109 and can exchange data and a program via the removal medium 111.

Process operations based on various programs by the CPU 101 performs information processing and communications, which are described later, by the respective search device 1, market server 3, and user terminal 4.

Each information processing device constituting the search device 1, the market server 3, and the user terminal 4 is not limited to the constitution of the single computer device as illustrated in FIG. 3. The information processing device may be constituted of a plurality of systemized computer devices. The plurality of computer devices may be systemized with a LAN or a similar network or may be remotely disposed with Virtual Private Network (VPN) or a similar network using the Internet or a similar medium.

3. Flow of Processing

The following describes a flow of each processing performed by the search device 1 with reference to FIG. 4 to FIG. 7.

Figure 4:
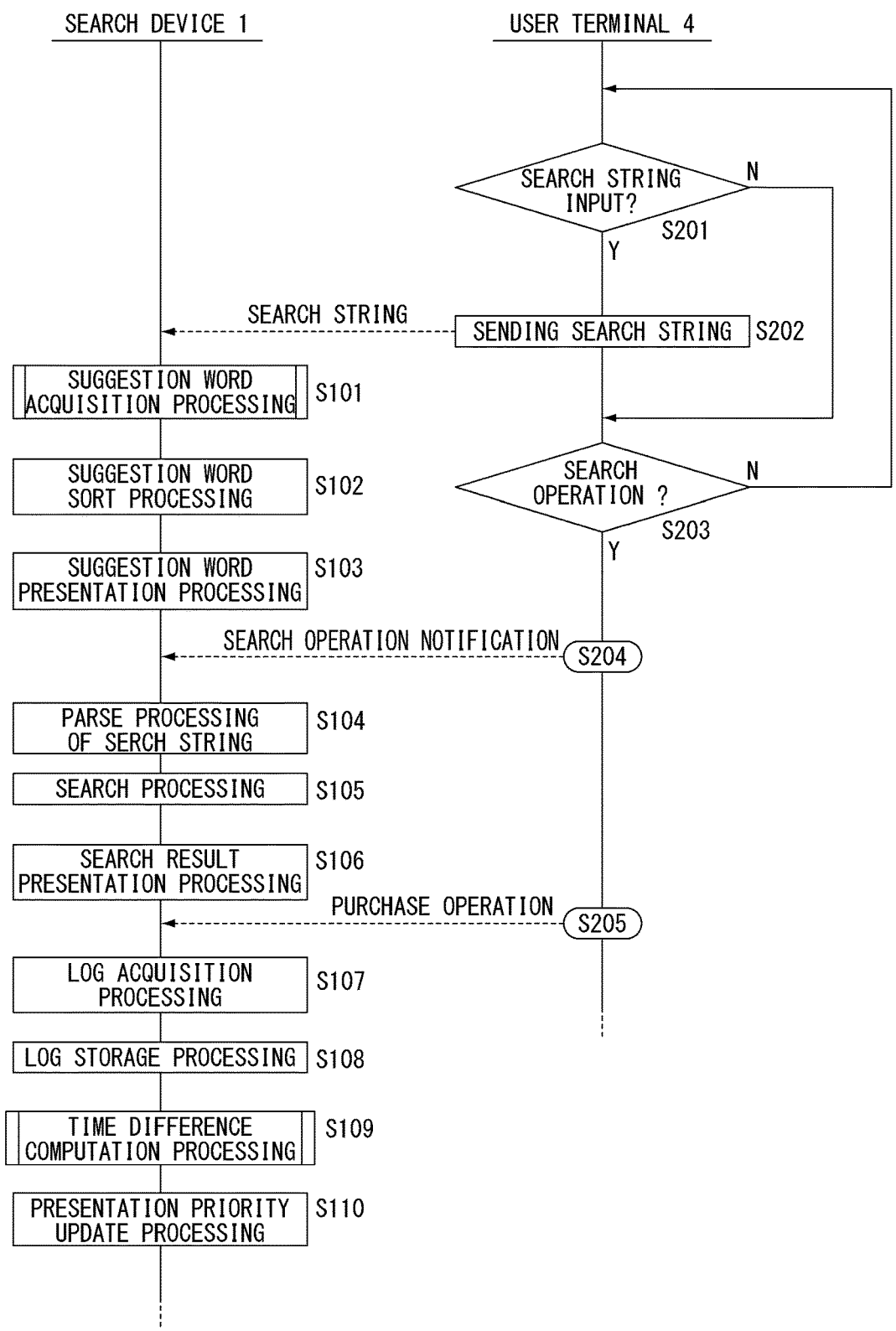
FIG. 4 is a drawing for describing a flow of entire processing.

First, at Step S201 in FIG. 4, the user terminal 4 determines whether an input operation of the search string is performed or not. When the user terminal 4 determines that the input operation of the search string is performed, the user terminal 4 transmits the search string to the search device 1 at Step S202. Step S201 determines the presence of the input operation of the search string by determination on each input of one character of the search string. For example, in the case where the user inputs "TOKEI (Watch)" in the Roman alphabet as the search string, the user terminal 4 determines that the input operation of the search string is performed by the input of "t", the first character of "TOKEI (Watch)". The user terminal 4 transmits "t" as the search string to the search device 1 at Step S202. Next, the user terminal 4 determines that the input operation of the search string is performed by the input of "o", the second character of "TOKEI (Watch)." The user terminal 4 transmits "to" as the search string to the search device 1 at Step S202.

Thus, whenever one character of the search string is input, the user terminal 4 transmits search string to the search device 1. These operations are performed by repeatedly performing Step S201 and Step S202 by the user terminal 4 as illustrated in FIG. 4. That is, repeating Step S201 and Step S202 inputs "TOKEI (Watch)" as the search string.

The input operation of the search string includes the case where one character is deleted from the search string. For example, the following describes the case where "ty" is input as the search string and then an operation of deleting "y" is performed. In this case, the input operation of "t", the input operation of "y", and the deletion operation of "y" are each treated as the inputs of the search string. That is, from the search string transmitted to the search device 1, "t" is transmitted first, "ty" is transmitted next, and finally, "t" after deleting y is transmitted again.

In the case of a language like Japanese that includes a plurality of character types (hiragana, katakana, kanji, and a similar character type), the input operation also includes an operation of converting the search string. For example, when inputting "nori" sets the search string as nori (first Japanese character of "NORI"), the search string transmitted to the search device 1 as the search string is "nori" (first Japanese character of "NORI"). Accordingly, presentation processing of suggestion words, which will be described later, presents "nori" (second Japanese character of "NORI"), "nori" (third Japanese character of "NORI"), and a similar character. Next, when an operation of converting "nori" (first Japanese character of "NORI") on the user terminal 4 sets "nori" (second Japanese character of "NORI") as the search string, this conversion operation is also regarded as the input operation of the search string. Accordingly, the search string "nori" (second Japanese character of "NORI") is transmitted to the search device 1. Thus, the presentation processing of suggestion words, which will be described later, does not present the suggestion words including "nori" (third Japanese character of "NORI") but presents the suggestion words including "nori" (second Japanese character of "NORI").

When the search string is transmitted from the user terminal 4, the search device 1 performs some processing to present the suggestion words according to the search string. Specifically, the search device 1 performs acquisition processing of the suggestion words which are related to the search string at Step S101. The search device 1 performs processing of sorting the suggestion words at Step S102. The search device 1 performs the presentation processing of the suggestion words at Step S103.

First, at Step S101, the suggestion word presentation unit 1c of the search device 1 acquires the suggestion words from the suggestion word DB 5a. The suggestion word DB 5a stores, for example, information regarding the suggestion words as illustrated in FIG. 5A. FIG. 5A illustrates excerpts of the suggestion words related to "TOKEI (Watch)." Suggestion word information includes a record ID given by one for each suggestion word, a plurality of pieces of search word information, and the presentation priority given by at least one for each. The search word information has main information and phonetic information. The main information represents the search word itself. The phonetic information represents information on sound.

To acquire the suggestion words from the suggestion word DB 5a, as illustrated in FIG. 5B, first, the suggestion word presentation unit 1c performs information acquisition processing regarding the search string at Step S301. Specifically, for example, in the case where "TOKEI (Watch)" is input on the user terminal 4 as the search string, the suggestion word presentation unit 1c of the search device 1 receives "TOKEI (Watch)" as the information of the search string from the search controller 1a and also receives "tokei" as the phonetic information of the search string. Next, at Step S302, the suggestion word presentation unit 1c performs the suggestion word search processing. Specifically, the suggestion word presentation unit 1c searches suggestion words with a search word starting from "tokei" from the suggestion word DB 5a. This search determines whether the search word matches a search condition or not by forward match. For example, since the search word "TOKEI (Watch) with ○○" starts with "tokei" like "tokeitsuki ○○", the search word is determined to match the condition. However, since the search word "OKIDOKEI (Clock in Japanese)" does not start with "tokei", the search word is determined not to match the condition.

The suggestion word search processing does not depend on the order of the search words included in the information on each suggestion word stored in the suggestion word DB 5a. Specifically, in the example of the suggestion word DB 5a in FIG. 5A, the suggestion word DB 5a stores "TOKEI (Watch)" all as the first search word among the plurality of search words which are related to the respective record IDs. However, regardless of this order, the suggestion word search processing is performed. Accordingly, for example, when inputting "digital" as the search string, the suggestion word presentation unit 1c performs the suggestion word search processing based on the phonetic information, "deji-taru." As a result, the four suggestion words with the record IDs ID0002, ID0012, ID0046, and ID0071 are determined to match the search condition.

Next, at Step S303 in FIG. 5B, the suggestion word presentation unit 1c of the search device 1 performs the suggestion word information acquisition processing. The suggestion word information acquisition processing acquires the search word information and the presentation priorities regarding the suggestion words determined to match the condition at Step S302.

Now, the description returns to FIG. 4. The suggestion word presentation unit 1c of the search device 1 performs suggestion word sort processing at Step S102 of FIG. 4. The suggestion word sort processing performs the suggestion word sort processing based on the presentation priority acquired from the suggestion word DB 5a. Specifically, for example, the presentation priority is information expressed by a higher value as a degree of priority presented to the user becomes high. The suggestion word presentation unit 1c performs the processing of sorting the suggestion words in the order of high presentation priority.

Next, at Step S103, the suggestion word presentation unit 1c performs processing of presenting the suggestion words to the user terminal 4. The suggestion word presentation processing transmits the suggestion word information such that the suggestion words are displayed on the user terminal 4 in the order of presentation priority. Specifically, as illustrated in FIG. 6A, the suggestion word presentation unit 1c instructs the communication controller 1g to transmit the information such that the suggestion words are displayed in the order of presentation priority on display software such as a web browser on the user terminal 4.

Figure 6A:
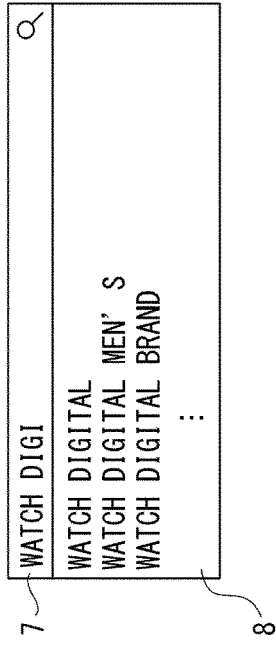
FIGS. 6A and 6B are a drawing illustrating an input form for product search and a drawing for describing an exemplary log database.

A description will be specifically given with reference to FIG. 6A. For example, FIG. 6A illustrates an input form 7 for the product search on the web browser or a similar browser. Under the input form 7, a suggestion word display area 8 is displayed. The suggestion word display area 8 is displayed by, for example, input of a character to the input form 7. The characters written by black line at the input form 7 and the suggestion word display area 8 ("TOKEI (Watch) digi" in the drawing) express the search strings input by the user. The solid-white characters ("tal", "tal men's", and "tal brand") express characters other than characters input by the user among the suggestion words presented by the search device 1. That is, the solid-white characters are parts removing "TOKEI (Watch) digi" from the presented suggestion words. The example illustrated in FIG. 6A shows that the suggestion words "TOKEI (Watch) digital" is the highest presentation priority, the suggestion words "TOKEI (Watch) digital men's" is the second highest presentation priority, and the suggestion words "TOKEI (Watch) digital brand" is the third highest presentation priority.

Next, Step S203 in FIG. 4 determines whether the search operation is performed on the user terminal 4 or not. The search operation is, for example, an operation of inputting the search string to the form to which the search string is to be input and pressing a search button near the form.

At Step S203, when determined that the search operation has been performed on the user terminal 4, at Step S204, the user terminal 4 notifies the search device 1 of the fact that search operation has been performed. At Step S203, when determined that the search operation has not been performed, the user terminal 4 returns to the processing of determining the presence of the input of search string at Step S201.

In the notification of the fact that search operation has been performed, the search string finally used for the search (that is, the search string finally selected by the user) is notified to the search device 1. When the user performs the search operation, as described above, the entire log DB records the search operation log.

Next, at Step S104, the query analyzer 1b of the search device 1 performs parse processing of the search string. Specifically, the search controller 1a that has received the search string from the communication controller 1g that has received search string transmits the search string to the query analyzer 1b and instructs the parse processing of the search string. Thus, the parse processing is performed. The parse processing of search string performs processing of extracting the search word specifically used for the search from the search string. The extraction of the search word is, for example, processed as follows. Phrases possibly becoming the search words are preliminary stored in a database in a format such as a list. Among the phrases in the list, the phrase included in the search string is extracted.

Subsequently, at Step S105, the search controller 1a performs the search processing to search the product using the search word extracted at Step S104. The search processing is processing to search the product associated with the search word among the respective products stored in the market DB 6 managed by the market server 3. That is, the search controller 1a searches each product stored in the market DB 6 via the market server 3. Since the search processing is not changed from the conventional technique, the detail of the search processing is omitted.

Next, at Step S106, the search controller 1a of the search device 1 performs search result presentation processing. The search result presentation processing presents the respective products searched at Step S105 in a proper order. The presentation order of the products is possibly as follows. For example, the count of accesses of each product is recorded. The products associated with the search words are presented in the order of the largest count of accesses.

The processing up to now, the search device 1 presents the search results according to the operation of the product search by the user. This allows the user to acquire the information on the product that the user wants to search.

The following describes each processing performed by the search device 1 according to an operation where the user selects a favorite product among respective products displayed as search results and actually purchases the product or a similar operation.

First, at Step S205 in FIG. 4, the user performs the purchase operation and the purchase preliminary operation. The purchase operation is, as described above, for example, an operation of confirming the order. The purchase preliminary operation is, as described above, for example, an operation of ensuring the selected product in the shopping cart.

When the user performs the purchase operation and the purchase preliminary operation, as described above, the entire log DB records the purchase operation log. Next, at Step S107, the log acquisition unit 1d of the search device 1 performs processing of acquiring the search operation logs and the purchase operation logs. Regarding the timing of acquiring the respective logs from the entire log DB, for example, the log acquisition unit 1d may acquire newly added search operation logs and purchase operation logs at regular intervals. Alternatively, the log acquisition unit 1d may receive a notification regarding the fact that the entire log DB records the purchase operation logs from the market server and may acquire the search operation logs and the purchase operation logs not acquired yet.

Subsequently, at Step S108, the log acquisition unit 1d performs processing of recording the search operation logs and the purchase operation logs acquired at the previous Step S107 to the log DB 5b of the search DB 5. At Step S108, in addition to the above-described processing, the log acquisition unit 1d performs processing of notifying the time information management unit 1e of the fact that the logs stored in the log DB 5b has been updated.

Next, the time information management unit 1e of the search device 1 performs a time difference computation processing at Step S109. The time difference computation processing checks for unprocessed purchase operation logs among the search operation logs and the purchase operation logs stored in the log DB 5b and determines whether the update of the presentation priorities of the suggestion words is necessary or not. Here, the reason for determining whether the presentation priority is to be updated or not by the purchase operation logs is as follows. Only the search operation logs cannot update the presentation priority. Only when the search operation logs and the purchase operation logs corresponding to the search operation logs become complete, the update of the presentation priority is allowed. Additionally, this is because that, for example, the count of purchase operation logs is one with respect to several tens of the search operation logs, thus, the count of purchase operation logs is less than the count of search operation logs. Therefore, updating the presentation priority according to the presence of the unprocessed purchase operation logs is efficient.

Figure 6B:
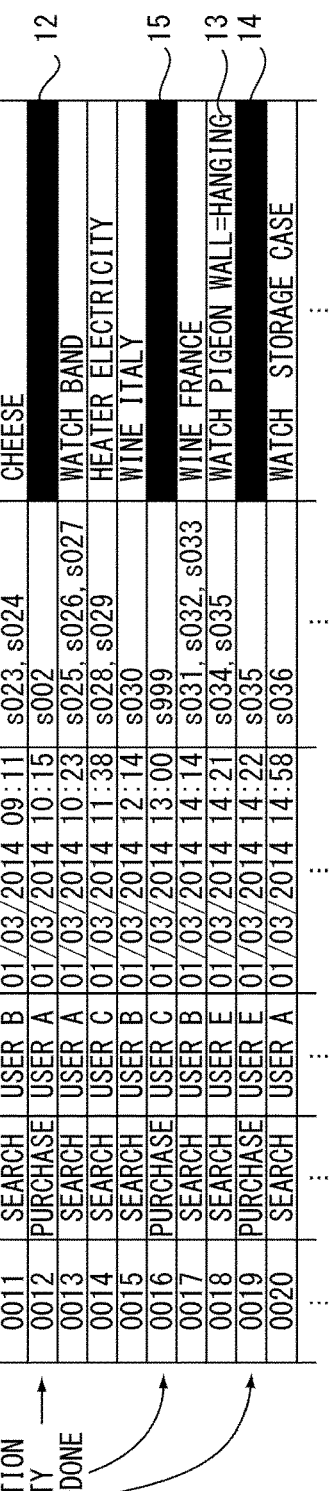

The following specifically describes the time difference computation processing with reference to FIG. 6B. FIG. 6B illustrates a part of the logs recorded in the log DB 5b by the log acquisition unit 1d. The logs each has information of the log ID, a log type, the user ID, a time, the product ID, and the search string.

The log ID is unique information such as a value assigned to one log. The log ID can uniquely identify the log.

The log type is information for distinguishing whether the log is the search operation log or the purchase operation log. The search operation log is displayed as "Search" while the purchase operation log is displayed as "Purchase". Here, the log type is expressed by character information; however, the log type may be expressed by value information. That is, for example, "0" may express the search operation log while "1" may express the purchase operation log.

The user ID expresses an ID for the user who has performed an operation causing the log to be generated.

The time expresses the time when the operation causing the log to be generated is performed. Here, the time has information in units of minutes; however, the time may have information in units of seconds.

The product ID expresses the ID for the product targeted for the operation causing the log to be generated. Specifically, the product ID for the search operation log expresses the ID for the product presented to the user by the search device 1 according to the search operation by the user. The product ID for the purchase operation log expresses an ID for the product on which the user has performed the purchase operation. The product IDs for the search operation logs list all product IDs presented as the search results. The product ID for the search operation log may be recorded which is related to the presentation order of the products presented as the search results. Accordingly, the log clarifies at what rank the product leading to the purchase is presented as the search result. This facilitates reflecting a purchase result to the presentation order of the search result.

The search strings are provided only for the search operation logs. The search string expresses the search string when the search operation is performed. This search string is possibly a character string input by the user and a character string selected from the suggestion words presented by the search device 1 by the user.

Here, among the logs shown in the table in FIG. 6B, reference numerals are given to some logs. A log 9 is a log when a user B searches "wine Chile." As the search results of this, the search device 1 presents the products whose product IDs are s006 and s007. A log 10 is a log when the user B purchases the product whose product ID is s007. That is, it is inferred that among the products with the product ID s006 and the product ID s007 presented as the search results by analysis of the log 9 and the log 10, the product with the product ID s007 is purchased.

Similarly, it is inferred that among the products with a product ID s001, a product ID s002, and a product ID s003 presented as the search results when a user A searches "TOKEI (Watch) tool" by analysis of a log 11 and a log 12, the product with the product ID s002 is purchased. It is inferred that among a log 13 and a log 14, a user E purchases a product with product ID s035. It can be seen from a log 15 that a user C purchases a product with product ID s999. However, a trace of the user C searching the product ID s999 is not found from the logs. Therefore, it is inferred that the user C does not purchase the product using a product search function of the search device 1 but, for example, browses a product page from a link or a similar medium for a web page posted on a blog or a similar website introducing the product and purchases the product.

Now, the subject returns to the description of the time difference computation processing by the time information management unit 1e of the search device 1 at Step S109. For example, as illustrated in FIG. 6B, the update of the presentation priorities of the suggestion words based on the purchase operation log with log ID 0004 has already been terminated. Meanwhile, the update of the presentation priorities of the suggestion words based on the purchase operation logs with a log ID 0012, a log ID 0016, and a log ID 0019 has not been terminated. To distinguish these statues, the purchase operation logs each may include flags indicative of whether the update of presentation priority has been terminated or not.

Figure 7:
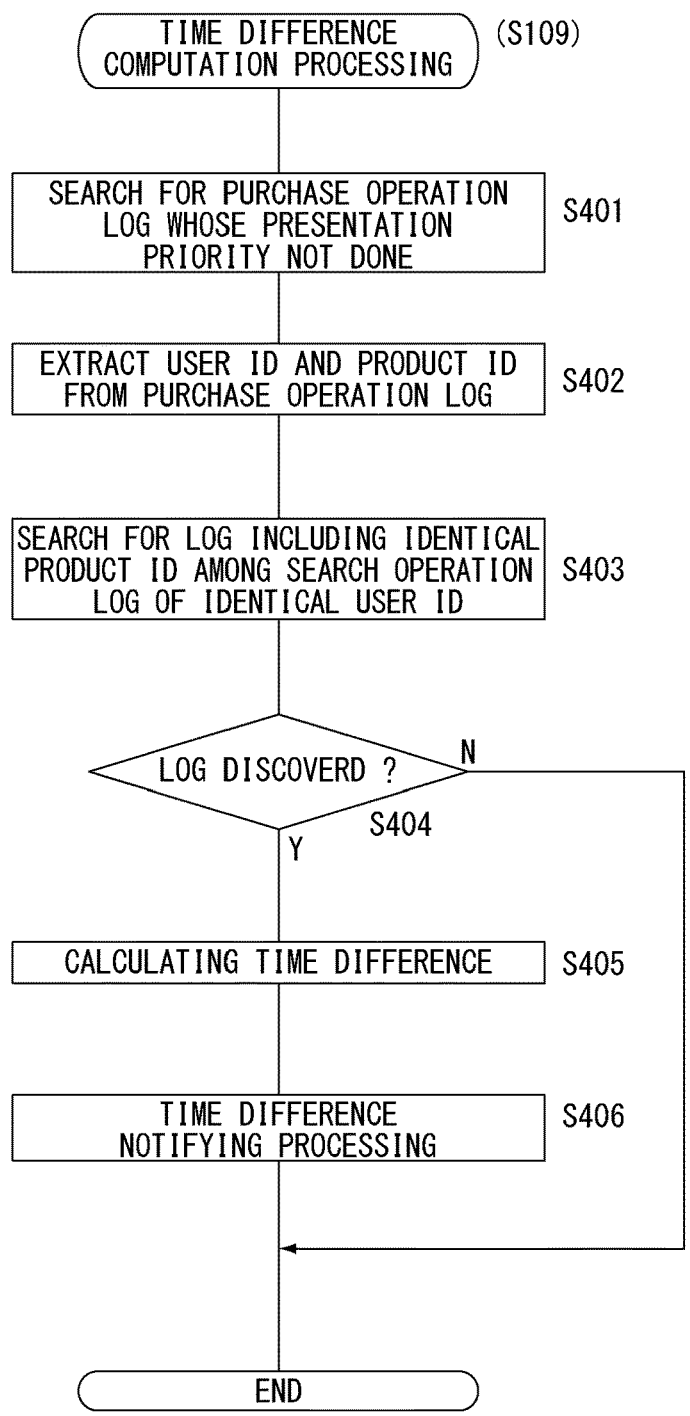
FIG. 7 is a flowchart illustrating a time difference computation processing.

FIG. 7 illustrates a flow of specific processing of the time difference computation processing. In the time difference computation processing, first, the time information management unit 1e finds out a purchase operation log where the update of the presentation priority has not been terminated among the logs stored in the log DB 5b at Step S401. The description will be specifically given using FIG. 6B. From the log ID 0004 where the update of the presentation priority has been terminated, the time information management unit 1e checks the logs in the ascending order (to downward in the table of FIG. 6B) to find out the purchase operation log with log ID 0012 where the update of the presentation priority has not been terminated.

Next, at Step S402 in FIG. 7, the time information management unit 1e extracts the user ID and the product ID from the purchase operation log where the update of the presentation priority has not been terminated. Specifically, from the purchase operation log with log ID 0012 in FIG. 6B, the time information management unit 1e extracts the user A as the user ID and s002 as the product ID.

Then, the time information management unit 1e searches the log including the product ID identical to the purchase operation log among the search operation logs with the identical user ID at Step S403 in FIG. 7. Then, the search operation logs having the time information prior to the purchase operation log is targeted for the search. This is because that even if the search operation logs after the purchase operation log is searched, the search operations performed before the purchase operation do not lead to the purchase operation. Specifically, the time information management unit 1e searches the search operation logs having the time information before the log ID 0012 in FIG. 6B to find out the search operation log performed by the user A, identical to the person who has performed the purchase operation, and where the product s002 is presented as the search result, the log ID 0001.

Next, the time information management unit 1e determines whether the corresponding log has been found or not at Step S404 in FIG. 7. Specifically, in the example of FIG. 6B where the presentation priority is updated according to the purchase operation log with log ID 0012, the log ID 0001 can be found out. Accordingly, the time information management unit 1e determines that the corresponding log can be found. In this case, at Step S405 in FIG. 7, the time information management unit 1e calculates the time difference. Specifically, in the example of FIG. 6B where the presentation priority is updated according to the purchase operation log with log ID 0012, the time information management unit 1e calculates a difference in the time information between the log ID 0001, which is the log of the operation that the user A searches the product ID s002, and the log ID 0012, which is the log of the operation that the user A purchases the product ID s002. That is, as the time difference between Jan. 2, 2014 at 15:21 and Jan. 3, 2014 at 10:15, 18 hours and 54 minutes is calculated.

Then, the time information management unit 1e performs time difference notification processing at Step S406 in FIG. 7. In the time difference notification processing, the time information management unit 1e notifies the priority management unit 1f of the calculated time difference and the search string used for the search. Specifically, in the example of FIG. 6B where the presentation priority is updated according to the purchase operation log with log ID 0012, the time information management unit 1e notifies the priority management unit 1f of 18 hours and 54 minutes, which is as the time difference calculated as described above, and "TOKEI (Watch) tool", which is the search string of the log ID 0001 of the search operation log.

The example of FIG. 6B where the presentation priority is updated according to the purchase operation log with log ID 0012 is described above. In the case where there is another purchase operation log where the update of the presentation priority is required, the time information management unit 1e repeatedly performs Step S109 in FIG. 4 (namely, Step S401 to Step S405 in FIG. 7).

To update the presentation priority based on the purchase operation log with log ID 0016 in FIG. 6B, the log of searching the product ID s999, which is targeted for purchase, cannot be found in the purchase operation log. Therefore, the time information management unit 1e determines that the corresponding log cannot be found at Step S404 in FIG. 7. In this case, as described above, it is inferred that the user has browsed the product page from the blog or a similar website without the use of the search function and has leaded to purchase the product. Accordingly, the time difference computation processing at Step S109 is terminated without performing Step S405 and Step S406.

Now, the description returns to FIG. 4. After terminating the time difference computation processing at Step S109 in FIG. 4, the priority management unit 1f of the search device 1 performs the presentation priority update processing at Step S110.

The presentation priority update processing updates the presentation priority associated with the search string notified by the time information management unit 1e. Specifically, in the example of FIG. 6B where the presentation priority is updated according to the purchase operation log with log ID 0012, the priority management unit if updates the presentation priority associated with the suggestion words "TOKEI (Watch) tool." In the case where it is determined that the log cannot be found in the processing of determining whether the corresponding log can be found or not at Step S404, which is performed in Step S109, the presentation priority update processing at Step S110 is not performed.

The presentation priority, for example, may use the average time of the time difference for the degree of priority. For example, assume the case where it is inferred from the search results presented according to the product search by the suggestion word "○○" (This case includes the case of directly inputting the character string identical to the suggestion word without the use of the suggestion word presented by the search device 1.) that there are three logs of purchasing the product, and the time difference between the search operation logs and the purchase operation logs are each one hour, two hours, and three hours. The presentation priority may be ranked based on two hours, the average time of the three time differences. As one example, a value of −120, a value putting a minus to 120, minute representation of two hours, is set to the degree of priority. The presentation priority of the suggestion word with which time taken from the search until the purchase is short should be set high. According to the above-described calculation, the shorter the time difference is, the higher the value is (namely, closes to 0).

To achieve this, the suggestion word DB 5a, for example, stores the count of time differences used for calculating the presentation priority. In the above-described example, the suggestion word DB 5a stores the presentation priority, −120 and 3, which is the count of time differences used for the calculation. Accordingly, for example, assume the case where the fourth time difference calculated based on the subsequent purchase operation log is four hours. By multiplying −120 by 3, further adds −240 (the presentation priority when the time difference is four hours), and dividing the value by 4, the presentation priority of −150 to which the four time differences have been reflected can be acquired.

In another example of the presentation priority, the presentation priority may be calculated also accommodating another element other than the time difference. For example, in the case where the average time difference of the purchase operation logs regarding the suggestion word "○○" is ten minutes and the average time difference of the purchase operation logs regarding the suggestion word "ΔΔ" is 30 minutes, if basing on the above-described example, the presentation priority of the suggestion word "○○" becomes high. However, in the case where the purchase operation logs regarding the suggestion word "ΔΔ" is 100 while the purchase operation log regarding the suggestion word "○○" is one, that is, in the case where suggesting the suggestion word "ΔΔ" leads to 100 purchases, the presentation priority of the suggestion word "ΔΔ" may be set to high. Specifically, a method that calculates a value from the time difference and a value to which the count of purchase operation logs are reflected, appropriately weights the respective values, and performs an addition and multiplication on the values is possible. As well as the count of purchase operation logs, a purchase price per product, the total sum of the products purchased through the presentation of the suggestion words, and a similar condition may be considered to calculate the presentation priority.

This allows calculating the balanced presentation priority considering both the element of the time difference and other elements.

Further, the suggestion words based on the above-described respective presentation priorities may be mixed and presented. For example, in the case of presenting ten suggestion words, the five suggestion words may be selected using the presentation priority calculated based on the user operations during the most recent n months while the remaining five suggestion words may be selected using the presentation priority calculated based on the purchase price per product.

This presents the suggestion words based on the presentation priorities calculated considering the respective advantages from various aspects to the user. This allows providing the search device meeting a wide variety of user's characteristics.

4. Other Embodiments

The other embodiments differ in the presentation priority update processing at Step S110 in FIG. 4 from the above-described embodiment. Therefore, the following describes the flow of the presentation priority update processing of this embodiment with reference to FIGS. 8A and 8B.

The presentation priority update processing according to the embodiment updates the presentation priority using the time difference calculated based on the search operations and the purchase operations by the user performed within a predetermined period. Accordingly, the time information management unit 1e transfers the search operation logs together with the calculated time difference or the time information of the purchase operation logs to the priority management unit 1f. Here, the example of transferring the time information of the purchase operation logs will be described.

Figures 8A, 8B:
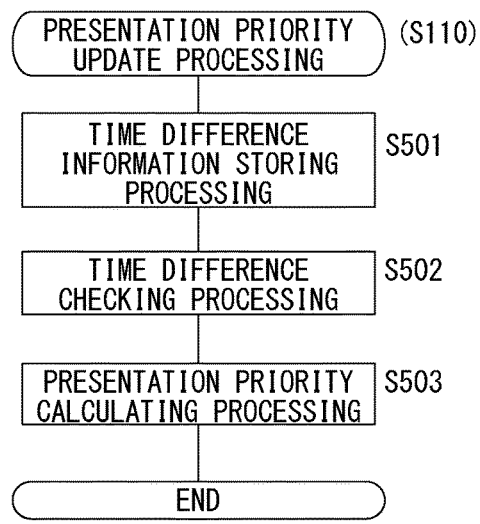
FIGS. 8A and 8B are a suggestion word database and a flowchart illustrating a presentation priority update processing of another embodiment.

First, as illustrated in FIG. 8A, the suggestion word DB 5a stores time difference information as well as the record ID, the search word information, and presentation priority information. The time difference information associates the time difference with the time information of the purchase operation logs and is stored. Further, the suggestion word DB 5a may store at least the time information of the purchase operation logs within the predetermined period as the time difference information. The suggestion word DB 5a may not store the time difference information based on the purchase operation logs outside of the predetermined period. In the example in FIG. 8A, the predetermined period is set to one month. The suggestion word DB 5a does not store the time difference information based on the purchase operation logs performed equal to or more than one month ago from the present (for example, Feb. 3, 2014).

In the presentation priority update processing, as illustrated in FIG. 8B, the priority management unit 1f first performs processing of storing the time difference information received from the time information management unit 1e to the suggestion word DB 5a at Step S501.

Next, the priority management unit 1f performs processing of checking the time difference information of the suggestion words to be updated at Step S502. Here, the priority management unit 1f performs processing of checking the time information associated with the time difference of the suggestion words to be updated stored in the suggestion word DB 5a and deleting the time difference information outside of the predetermined period.

Next, the priority management unit 1f performs processing of calculating the presentation priority at Step S503. Specifically, using the time difference of the time difference information of the suggestion words to be updated, for example, the priority management unit 1f performs processing such as calculating an average value.

This calculates the presentation priority based on the most recent user operations. That is, for example, the trend of the presentation priority changes depending on a season. The presentation priority also changes depending on a fashion. The processing allows presenting the suggestion words along with the season or the suggestion words catching up with the fashion.

As described above, whether the purchase operation logs have been performed within the most recent n months or not is determined. However, whether the search operation logs are based on the operations performed within the most recent n months or not may be determined. In this case, the priority management unit 1f receives the time information of the search operation logs from the time information management unit 1e, associates the time information with the time difference, and stores the information in the suggestion word DB 5a at Step S501. Therefore, Step S502 determines whether the time information of the search operation logs is within the predetermined period or not. Then, based on the result, Step S502 deletes the time difference information or performs similar processing.

In another example of the time difference computation processing, the time difference may be calculated based on n items of the purchase operation logs that are temporally new. Specifically, in the case where the count of logs inferred that the product purchase has been performed based on the suggestion word "○○" is 100, the time difference of the most recent 50 logs among the 100 logs may be calculated and the presentation priority may be updated. In this case, 50 pieces of time difference information is stored per suggestion word stored in the suggestion word DB 5a. Whenever the new time difference information is stored, the oldest time difference information is deleted.

5. Exemplary Suggestion Word Search Processing

At the above-described Step S302 in FIG. 5B, the example of presenting the suggestion words based on the input search string "TOKEI (Watch)" is described. Specifically, for example, the example of the suggestion word search processing that searches the suggestion words with the search word starting with "tokei" from the suggestion word DB 5a illustrated in FIG. 5A is described. Here, the following describes the example of the suggestion word search processing in the case where the input search string is not one complete word.

5-1. First Exemplary Suggestion Word Search Processing

As the first exemplary suggestion word search processing, which is shown at Step S302 in FIG. 5B, the following describes the exemplary suggestion word search processing to the search string in the middle of input.

As described above, the search device 1 receives the search string whenever one character of the search string is input on the user terminal 4. Accordingly, in the case where "tokei" is input as "TOKEI (Watch)", the suggestion word search processing is performed five times in total. Therefore, the suggestion word search processing is performed not only on the search string meaningful as a word such as "TOKEI (Watch)" but also on the search string in the middle of input like "Japanese character of "TO" and k" ("tok" as the phonetic information). However, as described above, the suggestion word search processing searches using the phonetic information. Accordingly, the suggestion word search processing performs comparison also on the search string in the middle of input, "Japanese character of "TO" and k" using the phonetic information "tok" with the phonetic information stored in the respective search words in the suggestion word DB 5a by forward match. Thus, the suggestion word search processing can determine whether the search word matches the search condition or not. That is, since the search device 1 performs the suggestion word search processing based on the phonetic information, the processing is accurately performed also on such search string in the middle of input.

5-2. Second Exemplary Suggestion word Search Processing

As the second exemplary suggestion word search processing, which is shown at Step S302 in FIG. 5B, the following describes the exemplary suggestion word search processing in the case where the search string includes a plurality of words, for example, "digital TOKEI (Watch)." In this case, the suggestion word presentation unit 1c searches the suggestion word matching the condition from the suggestion word DB 5a based on the two words, "digital" and "TOKEI (Watch)." In this respect, among the two words, the word "digital" is regarded as already completed word; therefore, a search by exact match is performed with "digital." The word "TOKEI (Watch)" has a possibly of further continuing a character after that, such as "TOKEI (Watch) cell" and is regarded as an incomplete word; therefore, a search by forward match is performed. Accordingly, the description will be specifically given with the example of FIG. 5A. When the suggestion word presentation unit 1c performs the suggestion word search processing at Step S302 on the search string "digital TOKEI (Watch)", the three suggestion words whose record IDs are ID0002, ID0012, and ID0071 are determined to match the condition. However, since in the suggestion words whose record ID is ID0046, "digital" does not match "for digital" by exact match, the suggestion words are determined not to match the condition.

6. Modifications

In the above-described embodiments, the suggestion word DB 5a stores the suggestion words without distinguishing the search string input by the user and the character string presented by the search device 1 in a complementary manner. Specifically, when the input of "TOKEI (Watch)" by the user presents "digital men's" in a complementary manner by presenting the suggestion words by the search device 1 and when the input of "TOKEI (Watch) digital" by the user presents "men's" in a complementary manner by presenting the suggestion word by the search device 1, the words are presented to the user based on the suggestion words "TOKEI (Watch) digital men's" in both cases. In this case, the order of storage of the search words included in the suggestion words stored in the suggestion word DB 5a may differ. The order may be "digital TOKEI (Watch) men's" and may be "men's TOKEI (Watch) digital."

However, as the example except for this, the suggestion word DB 5a may store the suggestion words corresponding to the respective character strings input by the user. For example, when the user inputs "TOKEI (Watch)" ("tokei" as the phonetic information), the suggestion word DB 5a may store a suggestion word list corresponding to the input character string "t", a suggestion word list corresponding to the input character string "to" (The phonetic information is "to."), and a suggestion word list corresponding to the input character string "Japanese character of "TO" and k" (The phonetic information is "tok."), respectively. Similarly, in the case of the input character string being "toke" and "TOKEI (Watch)" as well, the respective suggestion word lists are stored. In this case, the processing of searching the suggestion words candidate for presentation at the presentation of the suggestion words (the processing at Step S302 in FIG. 5B) becomes easy. That is, in the case where the character string input by the user is "t", the suggestion word list corresponding to "t" becomes the search processing result of the suggestion words as it is.

Further, as the information of the suggestion words stored in the suggestion word DB 5a, as illustrated in FIG. 5A, the example of constitution by a collection of respective information of the search words constituting the suggestion words is shown. However, without dividing the search words, the suggestion words may be stored as it is. Specifically, in FIG. 5A, in the record ID of ID0001, the suggestion word "TOKEI (Watch)" and the degree of priority Y0001 are stored. In ID0002, the suggestion words "TOKEI (Watch) digital" and the degree of priority Y0002 are stored. To search the suggestion words which are related to the search string input by the user, this case performs the search by forward match. Accordingly, the suggestion word DB 5a stores the suggestion words "TOKEI (Watch) digital" and the suggestion words "digital TOKEI (Watch)" as the suggestion words having different record IDs.

To search in a category of book and search in a category of clothing, the degree of priority of the presented suggestion words is possibly different. Therefore, in the case of a plurality of categories for searching a product, the categories each may have the presentation priorities different from the suggestion words. Specifically, even if the identical suggestion words are used, in the case of selecting "book" and in the case of selecting "clothing" as the product category, the suggestion words are sorted and presented based on different presentation priorities. In other words, the two presentation priorities, the presentation priority for the "book" search and the presentation priority for the "clothing" search, are associated with one suggestion word and are stored in the suggestion word DB 5a. The presentation priorities associated with the one suggestion word are not limited to two and may be plural.

Additionally, in the case of the plurality of market servers 3 each function as systems to sell different products, the presentation priorities where the suggestion words are different depending on the respective sells systems may be provided. For example, this is possibly the case such as the case of the plurality of market servers 3, such as the market server 3 for selling books and the market server 3 for selling clothing.

Thus, in the case where the plurality of presentation priorities are associated with the one suggestion word, the suggestion word presentation unit 1c selects one presentation priority according to the object and performs the suggestion word sort processing based on the presentation priority. The time information management unit 1e notifies the priority management unit 1f of not only the calculated time difference and the search strings included in the search operation logs but also the selected product category and the information of the market server 3 in the time difference notification processing shown at Step S406 in FIG. 7. Therefore, the search operation log is constituted including the product category with which the search has been performed and the information on the market server 3. Further, the priority management unit 1f selects the one presentation priority among the plurality of presentation priorities based on the notified product category and the information of the market server 3 for update.

This presents the suggestion words based on the appropriate presentation priority for each product to be searched by the user. This allows providing an environment where the product to be purchased is easily searched.

Further, as another example associating the one suggestion word with the plurality of presentation priorities, an example of considering a user attribute is possible. For example, depending on the case of the user being a "man" and the case of the user being a "woman", the suggestion words based on the different presentation priorities are presented. Additionally, a combination of an "adult" and a "child" or a similar combination is also possible. In this case, the user may correspond to "man" and correspond to "adult." That is, the suggestion words are possibly presented based on the two or more presentation priorities among the plurality of presentation priorities.

In such case, for example, when presenting ten suggestion words, five suggestion words are selected from the suggestion words based on the presentation priority for "man" and five suggestion words are selected from the suggestion words based on the presentation priority for "adult", thus the ten suggestion words in total may be presented.

Using the two values of the presentation priority for "man" and the presentation priority for "adult", the combined presentation priority may be newly calculated. Based on the newly combined presentation priority, the ten suggestion words may be selected and presented.

The above-described embodiments describe the example where as well as the log DB 5b of the search DB 5, the entire log DB that records various logs regarding the operations performed by the user is provided. However, the log DB 5b may double as the entire log DB.

This allows reducing the count of databases, ensuring effective use of devices used for establishing the databases.

In the above-described embodiments, the actually tangible products, such as "TOKEI (Watch)" and nori" (second Japanese character of "NORI"), are used as exemplary products; however, intangible products may be applied. For example, service (labor), such as an overnight travel package and a massage may be applied.

This allows an application of the content of the present invention also to the market server 3 that sells not only products but also service. This allows providing the search device featuring high utility value for the users.

The example that the search device 1 is coupled to the market server 3 via the communications network 2 is described. However, the search device 1 may not be coupled to the communications network 2 but may be coupled to the market server 3 with a local network. Alternatively, the search device 1 may be disposed at the inside of the market server 3. In these cases, a part having a function of accepting an instruction for search or a similar instruction from the user terminal 4 is disposed at the market server 3. Through the part, the search device 1 receives the instruction from the user terminal 4.

When Step S202, Step S101, Step S102, and Step S103 in FIG. 4 are repeated and the user inputs the one character of the search string for each, the search device 1 may perform the search whenever the user inputs the one character of the search string and may transmit the search result to the user terminal 4. This search may search a word fixed in the input search string (for example, in a state such as "TOKEI (Watch) d" in the middle of input of "TOKEI (Watch) digital", the "TOKEI (Watch)" is a fixed word). This search may search using a suggestion word with the highest presentation priority among the presented suggestion words.

Accordingly, even if the search string is in the middle of input, when the search result is presented and the objective product is presented, the product can be selected. This allows the user to provide the convenient search device.

At Step S403 in FIG. 7, to search the search operation logs by the user identical to the purchase operation logs, regarding the logs of the purchase operation logs on which the search operation has been performed before the certain period of time or more, it may be inferred that the product is not purchased based on the search. For example, in the case where the time information of the purchase operation log is one month later from the time information of the search operation log, it can be regarded that the search operation is not related to the purchase operation. That is, to search the search operation logs based on the purchase operation logs, for example, the search may be limited to the logs whose time difference is within 24 hours. Accordingly, it is only necessary to search only a part of the logs among the logs stored in the log DB 5b, allowing quick execution of the time difference computation processing.

7. Summary

The above-described search device 1 includes the suggestion word presentation unit 1c, the time information management unit 1e, and the priority management unit 1f. The suggestion word presentation unit 1c is configured to acquire a suggestion word according to an input search string and a presentation priority from the suggestion word DB 5a and present a suggestion word based on the presentation priority. The suggestion word DB 5a stores the suggestion word and the presentation priority of the suggestion word associated to be searched by the input search string. The time information management unit 1e is configured to calculate time difference between time when a search is performed and a time when a predetermined purchase operation or purchase preliminary operation is performed on a product which is related to the search. The priority management unit 1f is configured to update the presentation priority stored in the suggestion word DB 5a to raise a presentation priority, which is associated with a suggestion word used for a search, higher as the time difference is smaller. This presents the suggestion words based on the presentation priorities to which the time taken until the purchase has been reflected. This allows presenting the suggestion words appropriate for the search to purchase the product.

As described in another embodiment, the priority management unit 1f of the search device 1 is configured to update the presentation priority using the time difference based on a user action performed in a predetermined period. The time difference is acquired by the time information management unit 1e. This presents the suggestion words to which the most recent user action has been reflected. This allows presenting appropriate suggestion words to which a trend, which changes according to a fashion and a season, has been reflected.

Further, the time information management unit 1e of the search device 1 is, as described above, configured to calculate the time difference based on the search operation logs and the purchase operation logs. This acquires the required information from the formalized information. This allows easily performing the time difference computation processing.

Further, in the case where the purchase operation log is detected, the time information management unit 1e of the search device 1 is configured to search the search logs based on searches performed before the purchase operation or the purchase preliminary operation. The time information management unit 1e is configured to calculate the time difference based on the purchase operation logs and the search operation logs. Accordingly, it is only necessary to detect the purchase operation logs, which is less than the search operation logs. Accordingly, the time difference computation processing can be effectively performed.

The time information management unit 1e of the search device 1 is configured to acquire a user ID and a product ID included in the purchase operation log. The time information management unit 1e is configured to search the search operation log having identical user ID and identical product ID. The time information management unit 1e is configured to calculate the time difference based on the purchase operation logs and the search operation logs. This allows linking the product information acquired by the search and the purchase operation performed based on the product information. This allows performing the time difference computation processing with more certainty.

As described in the modification, with the search device 1, in the suggestion word DB 5a, a plurality of presentation priorities are associated with each suggestion word and stored. The suggestion word presentation unit 1c is configured to acquire at least one presentation priority selected from a plurality of presentation priorities. This presents the suggestion words based on the presentation priorities selected according to the situation. This allows providing an environment of ensuring presenting the suggestion words going with various situations.

As described in the modification, with the search device 1, the suggestion word DB 5a stores a presentation priority for each user attribute as a plurality of presentation priorities indicative of a user attribute of a user who performs a search. The suggestion word presentation unit 1c is configured to select and acquire a presentation priority according to the user attribute of a user who performs the search. The arrangement of the suggestion words is changed based on the presentation priorities different depending on the user, and the suggestion words are presented. This allows providing an environment of presenting the appropriate suggestion words along the user attribute.

As described in the modification, with the search device 1, the suggestion word DB 5a is configured to associate and store a presentation priority for each product category as a plurality of presentation priorities. The suggestion word presentation unit 1c is configured to select and acquire a presentation priority according to a product category selected during a search. The arrangement of the suggestion words is changed based on the presentation priorities different depending on the genre of the product, and the suggestion words are presented. This allows providing an environment of presenting the suggestion words appropriate for the product to be searched.

8. Program and Storage Medium

The search device 1 of the present invention is described above. The program of the embodiments is a program that causes a processing unit (CPU or a similar unit) to execute the processing in the search device 1.

A program of the embodiment is configured to cause a processing unit to perform a suggestion word presentation processing configured to acquire a suggestion word according to an input search string and a presentation priority from a suggestion word database and present a suggestion word based on the presentation priority, the suggestion word database storing the suggestion word and the presentation priority of the suggestion word associated to be searched by the input search string. The program is configured to cause the processing unit to perform the program time difference computation processing configured to calculate time difference between time when a search is performed and a time when a predetermined purchase operation or purchase preliminary operation is performed on a product which is related to the search. Further, the program is configured to cause the processing unit to perform a presentation priority update processing configured to update the presentation priority stored in the suggestion word database to raise a presentation priority associated with a suggestion word used for a search, higher as the time difference is smaller.

That is, this program is a program that causes the processing unit to perform each processing shown at Step S101 to Step 110, which is described in FIG. 4, each processing shown at Step S301 to Step S303, which is described in FIG. 5B, and each processing shown at Step S401 to Step S406, which is described in FIG. 7.

This program allows achieving the above-described search device 1.

Such program can be preliminary recorded in an HDD as a recording medium built into a device such as a computer device, a ROM in a microcomputer including a CPU, or a similar medium. Alternatively, a removable recording medium, such as a semiconductor memory, a memory card, an optical disk, a magneto-optical disk, or a magnetic disk, can store (record) the program temporarily or permanently. Such removable recording medium can be provided as so-called package software.

Such program can be installed from the removable recording medium to a personal computer or a similar device. Besides, the program can also be downloaded from a download site via a network such as a LAN and the Internet.

REFERENCE SIGNS LIST 1 search device
1a search controller
1b query analyzer
1c suggestion word presentation unit
1d log acquisition unit
1e time information management unit
1f priority management unit
1g communication controller
2 communications network
3 market server
4 user terminal
5 search DB 5a suggestion word DB
5b log DB

What is claimed is:

1. A search device comprising:
   at least one memory operable to store program code; and
   at least one processor operable to read said program code and operate as instructed by said program code, said program code comprising:
   suggestion word presentation code configured to cause at least one of said at least one processor to present a suggestion word based on a presentation priority by acquiring the suggestion word according to an input search string and a presentation priority from a suggestion word database, the suggestion word database storing the suggestion word and the presentation priority of the suggestion word to be searched by the input search string, the input search string received from a terminal device, the suggestion word being transmitted to the terminal device for presentation;
   time information management code configured to cause at least one of said at least one processor to:
   A) identify a first plurality of purchase events in an e-commerce log database, wherein the first plurality of purchase events includes a first purchase event and a second purchase event,
   B) identify a first search event corresponding to the first purchase event, wherein a predetermined purchase operation or a purchase preliminary operation is performed on a product which is related to the first search event,
   C) form, entry by entry over the e-commerce log database, a second plurality of purchase events by excluding the second purchase event and including the first purchase event in the second plurality of purchase events, wherein:
      i) the second purchase event is not preceded in the e-commerce log database by a search event,
      ii) the second purchase event occurred more than a predetermined time in the past, or
      iii) the second purchase event has been replaced by the first purchase event in terms of a fixed number of most recent purchase events,
      wherein the second plurality of purchase events correspond one to one to a plurality of preceding search events, wherein the plurality of preceding search events includes the first search event, and wherein the plurality of preceding search events are associated with one or more search strings, and
   D) calculate a plurality of time differences between the plurality of preceding search events and respective ones of the second plurality of purchase events; and
   priority management code configured to cause at least one of said at least one processor to update the presentation priority of the suggestion word stored in the suggestion word database based on the plurality of time differences.

2. The search device according to claim 1, wherein the time information management code is further configured to cause at least one of said at least one processor to:
   acquire user information and product information included in the e-commerce log database regarding the predetermined purchase operation or the purchase preliminary operation; and
   search the e-commerce log database for the first search event with a requirement of identical user information and identical product information between the first purchase event and the first search event.

3. The search device according to claim 1, wherein
   the suggestion word database stores a plurality of presentation priorities for each suggestion word, and
   the suggestion word presentation code is further configured to cause at least one of said at least one processor to acquire at least one presentation priority selected from the plurality of presentation priorities.

4. The search device according to claim 3, wherein
   the plurality of presentation priorities are based on a plurality of user attributes, and
   the suggestion word presentation code is further configured to cause at least one of said at least one processor to select and acquire the at least one presentation priority according to a user attribute of a user performing a search.

5. The search device according to claim 3, wherein
   the plurality of presentation priorities include a presentation priority for each product category of a plurality of product categories, and
   the suggestion word presentation code is further configured to cause at least one of said at least one processor to select and acquire a presentation priority according to a product category selected during a search.

6. The search device according to claim 1, wherein the presentation priority of the suggestion word used for a search is inversely related to the calculated time difference.

7. The search device according to claim 1, wherein the time information management code is further configured to cause the at least one of said at least one processor to exclude from the plurality of time differences a first time difference associated with a first search string, wherein the first search string corresponds to a single purchase.

8. A search method performed by a computer, the search method comprising:
   presenting a suggestion word based on a presentation priority by acquiring a suggestion word according to an input search string and the presentation priority from a suggestion word database, the suggestion word database storing the suggestion word and the presentation priority of the suggestion word to be searched by the input search string, the input search string received from a terminal device, the suggestion word being transmitted to the terminal device for presentation;
   identifying a first plurality of purchase events in an e-commerce log database, wherein the first plurality of purchase events includes a first purchase event and a second purchase event;
   identifying a first search event corresponding to the first purchase event, wherein a predetermined purchase operation or a purchase preliminary operation is performed on a product which is related to the first search event,
   forming, entry by entry over the e-commerce log database, a second plurality of purchase events by excluding the second purchase event and including the first purchase event in the second plurality of purchase events, wherein:
      i) the second purchase event is not preceded in the e-commerce log database by a search event,
      ii) the second purchase event occurred more than a predetermined time in the past, or
      iii) the second purchase event has been replaced by the first purchase event in terms of a fixed number of most recent purchase events, wherein the second plurality of purchase events correspond one to one to a plurality of preceding search events, wherein the plurality of preceding search events includes the first search event, and wherein the plurality of preceding search events are associated with one or more search strings, and calculating a plurality of time differences between the plurality of preceding search events and respective ones of the second plurality of purchase events; and updating the presentation priority stored in the suggestion word database based on the plurality of time differences.

9. The method according to claim 8, wherein the presentation priority of the suggestion word used for a search is inversely related to the calculated time difference.

10. The method according to claim 8, further comprising:
displaying, on a touchscreen display of a user terminal, a second arrangement of the suggestion word and a second suggestion word, wherein the second arrangement is based on the updated presentation priority, wherein the updating the presentation priority further comprises updating, based on a user attribute, a first priority of the suggestion word and a second priority of the second suggestion word, wherein the presenting further comprises changing a first arrangement of the suggestion word and the second suggestion word to be the second arrangement of the suggestion word and the second suggestion word, and wherein the changing is based on the updated presentation priority.

11. A non-transitory storage medium having stored thereon a search program which when executed by a computer causes the computer to:

present a suggestion word based on a presentation priority by acquiring a suggestion word according to an input search string and the presentation priority from a suggestion word database, the suggestion word database storing the suggestion word and the presentation priority of the suggestion word to be searched by the input search string, the input search string received from a terminal device, the suggestion word being transmitted to the terminal device for presentation;

identify a first plurality of purchase events in an e-commerce log database, wherein the first plurality of purchase events includes a first purchase event and a second purchase event, identify a first search event corresponding to the first purchase event, wherein a predetermined purchase operation or a purchase preliminary operation is performed on a product which is related to the first search event, form, entry by entry over the e-commerce log database, a second plurality of purchase events by excluding the second purchase event and including the first purchase event in the second plurality of purchase events, wherein:

i) the second purchase event is not preceded in the e-commerce log database by a search event, ii) the second purchase event occurred more than a predetermined time in the past, or iii) the second purchase event has been replaced by the first purchase event in terms of a fixed number of most recent purchase events, wherein the second plurality of purchase events correspond one to one to a plurality of preceding search events, wherein the plurality of preceding search events includes the first search event, and wherein the plurality of preceding search events are associated with one or more search strings, and calculate a plurality of time differences between the plurality of preceding search events and respective ones of the second plurality of purchase events; and update the presentation priority stored in the suggestion word database based on the plurality of time differences.

12. The non-transitory storage medium according to claim 11, wherein the presentation priority of the suggestion word used for a search is inversely related to the calculated time difference.

13. A search method performed by a computer, the search method comprising:

comparing a time of purchase of a product, entry by entry, in a log entry of an e-commerce log database with a predetermined time;

identifying, based on the comparing, first e-commerce log database entries associated with a plurality of first dates, wherein the plurality of first dates are more recent by at least a predetermined time interval compared to the predetermined time, and wherein the first e-commerce log database entries include a purchase event, wherein the purchase event occurred at a second time;

identifying a search event corresponding to the purchase event, wherein a predetermined purchase operation or a purchase preliminary operation is performed on the product which is related to the search event, wherein the search event occurred at a first time before the second time;

calculating a time difference between the second time and the first time;

updating a presentation priority of a first suggestion word stored in a suggestion word database based on the time difference, wherein the first suggestion word is associated with the product;

receiving a search string from a terminal device;

forming an arrangement of the first suggestion word and a second suggestion word, wherein the arrangement is based on the presentation priority and based on the search string, wherein the forming includes: i) acquiring, based on the search string, the first suggestion word and the second suggestion word from the suggestion word database, and ii) acquiring the presentation priority from the suggestion word database; and transmitting the arrangement of the first suggestion word and the second suggestion word for display on a display screen of the terminal device.

14. The method of claim 13, wherein the predetermined time interval is one month.

15. The method of claim 13, wherein the predetermined time interval is twenty-four hours.

* * * * *